(12) United States Patent
Toyama et al.

(10) Patent No.: US 7,720,652 B2
(45) Date of Patent: May 18, 2010

(54) MODELING LOCATION HISTORIES

(75) Inventors: Kentaro Toyama, Miami, FL (US); Ramaswamy Hariharan, Irvine, CA (US)

(73) Assignee: Microsoft Corporation, Redmond, WA (US)

( * ) Notice: Subject to any disclaimer, the term of this patent is extended or adjusted under 35 U.S.C. 154(b) by 765 days.

(21) Appl. No.: 10/968,862

(22) Filed: Oct. 19, 2004

(65) Prior Publication Data

US 2006/0085177 A1 Apr. 20, 2006

(51) Int. Cl.
G06F 7/60 (2006.01)
G06F 17/10 (2006.01)

(52) U.S. Cl. ............................................. 703/2; 703/22
(58) Field of Classification Search ...................... 703/2, 703/22
See application file for complete search history.

(56) References Cited

U.S. PATENT DOCUMENTS

| | | | |
|---|---|---|---|
| 6,047,317 | A | 4/2000 | Bisdikian et al. |
| 6,078,594 | A | 6/2000 | Anderson et al. |
| 6,222,482 | B1 | 4/2001 | Gueziec |
| 6,430,547 | B1 | 8/2002 | Busche et al. |
| 6,496,814 | B1 | 12/2002 | Busche |
| 6,505,106 | B1 | 1/2003 | Lawrence et al. |
| 6,615,133 | B2 | 9/2003 | Boies et al. |
| 6,751,626 | B2 | 6/2004 | Brown et al. |
| 6,766,245 | B2 | 7/2004 | Padmanabhan |
| 2002/0108119 | A1 | 8/2002 | Mao et al. |
| 2003/0159143 | A1 | 8/2003 | Chan |
| 2003/0202775 | A1 | 10/2003 | Junkersfeld et al. |
| 2004/0128694 | A1 | 7/2004 | Bantz et al. |
| 2004/0160974 | A1 | 8/2004 | Read et al. |
| 2005/0075119 | A1* | 4/2005 | Sheha et al. ............. 455/456.6 |
| 2005/0078757 | A1 | 4/2005 | Nohrden |
| 2005/0154917 | A1 | 7/2005 | deCarmo |
| 2005/0172314 | A1 | 8/2005 | Krakora et al. |

OTHER PUBLICATIONS

"Cramer-Rao Bound for Location Estimation of a Mobile in Asynchronous Ds-Cdma Systems" Botteron et al. 2001 IEEE.*
"Mobility Modeling, Location Tracking, and Trajectory Prediction in Wireless ATM Networks", Liu et al. IEEE Aug. 1998.*
"A mobile virtual-distributed system architecture for supporting wireless mobile computing and communications", Liu2, Wireless Networks 1996.*

(Continued)

*Primary Examiner*—Kamini S Shah
*Assistant Examiner*—Saif A Alhija
(74) *Attorney, Agent, or Firm*—Lee & Hayes, PLLC (57) ABSTRACT

A location history is a collection of locations over time for an object. By applying a recurring time period to a location history, it can be converted into a stochastic model of the location history. For example, a location history can be reorganized based on intervals that subside a recurring cycle. In a described implementation, training a location history model involves traversing each interval of multiple cycles of a target location history. After each object location at each interval is entered into a training matrix, the intervals can be normalized to determine relative probabilities per location for each interval of a designated cycle. The training and resulting location history model can be Markovian or non-Markovian. Applications include probabilistic location estimation, fusion of location estimates, location-history simulation, optimal scheduling, transition analysis, clique analysis, and so forth.

31 Claims, 7 Drawing Sheets

OTHER PUBLICATIONS

Zhang, et al., "The Cost Model of Moving Objects Communication with GPS", International Conference on Communications, Circuits and Systems and West Sino Exposition Proceedings, 2002, vol. 2, pp. 1576-1580.

BenAbdelkader, et al., "Combining Holistic and Parametric Approaches for Gait Recognition," Submitted to IEEE Transactions on Pattern Analysis and Machine Intelligence, Dec. 2002, 37 pages.

BenAbdelkader, et al., "EigenGait: Motion-based Recognition of People Using Image Self-similarity," Proc. Intl. on Audio and Video-based Person Authentication (AVBPA), 2001, 11 pages.

BenAbdelkader, et al., "Motion-based Recognition of People in Eigengait Space," 5th International Conference on Automatic Face and Gesture Recognition, May 20, 2002, pp. 1-6.

BenAbdelkader, et al., "Person Identification Using Automatic Height and Stride Estimation," IEEE International Conference on Pattern Recognition, Aug. 11, 2002-Aug. 15, 2002, pp. 1-4.

BenAbdelkader, et al., "Stride and Cadence as a Biometric in Automatic Person Identification and Verification," 5th International Conference on Automatic Face and Gesture Recognition, May 20, 2002, pp. 1-6.

BenAbdelkader, et al., "View-invariant Estimation of Height and Stride for Gait Recognition," Workshop on Biometric Authentication (BIOMET), in association with ECCV 2002, Jun. 1, 2002, 12 pages.

Cutler, et al., "Robust Real-Time Periodic Motion Detection, Analysis, and Applications," IEEE Transactions on Pattern Analysis and Machine Intelligence (PAMI), vol. 22, No. 8, Aug. 2000, pp. 781-796.

Elgammal, et al., "Non-parametric Model for Background Subtraction," IEEE ICCV99 Frame Rate Workshop, IEEE 7th International Conference on Computer Vision, Kerkyra, Greece, Sep. 1999, pp. 1-17.

Gil, et al., "Simulation of a Mobility Prediction Scheme Based on Neuro-Fuzzy Theory in Mobile Computing", Simulation, Jul. 2000, vol. 75, No. 1, pp. 6-17.

Haritaoglu, et al., "W4S: A Real-Time System for Detecting and Tracking People in 2 1/2 D," in European Conference on Computer Vision, 1998, 16 pages.

"Multidimensional Database Technology", Computer, Dec. 2001, vol. 34, No. 12, pp. 40-46.

Tsai, R., "An Efficient and Accurate Camera Calibration Technique for 3d Machine Vision," Proceedings of the Computer Vision and Pattern Recognition, 1986, pp. 364-374.

Turk, et al., "Face Recognition Using Eigenfaces," CVPR, 1991. pp. 586-591.

Wolfson, et al., "Modeling Moving Objects for Location Based Services", Lectures Notes in Computer Science, 2002, vol. 2538, pp. 46-58.

Zhang, et al., "Data Modeling of Moving Objects with GPS/GIS in Web Environment", International Conference on Communications, Circuits and Systems and West Sino Exposition Proceedings, 2002, vol. 2 pp. 1581-1585.

* cited by examiner

MODEL ARCHITECTURE

2-D MATRIX PER INTERVAL
FOR ENTIRE CYCLE FOR OVERALL
MARKOVIAN 3-D MATRIX

MODELING LOCATION HISTORIES

TECHNICAL FIELD

This disclosure relates in general to modeling location histories and in particular, by way of example but not limitation, to creating and/or using a probabilistic location history model derived from applying a recurring time period to an actual location history.

BACKGROUND

Attaining positional information is becoming faster, easier, and cheaper. Furthermore, positional information may be repeatedly acquired and then collected and stored electronically. More specifically, geographic information systems (GIS) can produce what is called a location history. A location history is a record of an entity's location in geographical space over some interval of time.

Historically, location histories have been reconstructed by archaeologists and historians looking at migrating populations or census takers tracking demographics, at temporal resolutions of decades or centuries and spatial resolutions of tens or hundreds of kilometers. Recent advances in location-aware technology, however, allow the recording of location histories at a dramatically increased resolution. Examples of such location-aware technologies include the global positioning system (GPS), radio triangulation, localization via mobile phones and associated networks, interaction with IEEE 802.11 wireless systems, and monitoring of radio frequency identification (RFID) tags. These technologies make it feasible to track individual objects at resolutions of meters in space and seconds in time—in some cases, even greater resolution is possible.

These location-aware technologies along with modern computer storage capabilities enable a huge amount of positional data to be collected into a location history. The resulting location data points that are recorded for the location history can number in the hundreds, the thousands, the hundreds of thousands, or even higher. Unfortunately, although there are a few specific algorithms designed for certain particular applications of location histories, there are no general algorithms or approaches for organizing or otherwise handling this great wealth of location information.

Accordingly, there is a need for general schemes and/or techniques that can manipulate location histories, such as analyzing the location information thereof, modeling the location information thereof, and/or providing applications for using the analyzed or modeled location information.

SUMMARY

A location history is a collection of locations over time for an object. By applying a recurring time period to a location history, it can be converted into a stochastic model of the location history. For example, a location history can be reorganized based on intervals that subdivide a recurring cycle. In a described implementation, training a location history model involves traversing each interval of multiple cycles of a target location history. After each object location at each interval is entered into a training matrix, the intervals can be normalized to determine relative probabilities per location for each interval of a designated cycle. The training and resulting location history model can be Markovian or non-Markovian.

Evaluation of a subject location history with regard to a location history model is described. Object location prediction with a location history model is also described. Other applications include fusion of location estimates, location-history simulation, optimal scheduling, transition analysis, clique analysis and so forth.

Other method, system, approach, apparatus, device, media, procedure, arrangement, etc. implementations are described herein.

BRIEF DESCRIPTION OF THE DRAWINGS

The same numbers are used throughout the drawings to reference like and/or corresponding aspects, features, and components.

DETAILED DESCRIPTION

Introduction

A location history is a collection of locations over time for an object, including a person or group. Due to modern resolution and storage capabilities, location histories can have such a sheer volume and granularity of data that new possibilities for intricate analysis and data mining of a qualitatively different nature are now available. Generally, the following is described herein: probabilistic models to model (e.g., high-resolution) location histories and some present applications of these analytical tools.

Each location of a location history is recorded as a geographic position and a corresponding time at which the geographic position is determined. The geographic position may be determined in any manner and using any denotation, as is described further herein below. Generally, a stay is a single instance of an object spending some time in one place, and a destination is any place where one or more objects have experienced a stay.

These data and concepts are modeled, analyzed, etc. as described herein. First, probabilistic modeling of location histories is described qualitatively and then quantitatively in sections entitled "Modeling Location Histories Qualitatively" and "Modeling Location Histories Quantitatively". Second, applications of modeled location histories, location history models, etc. are described in a section entitled "Applications with Location Histories".

More specifically, a stay contains three pieces of information: a start time, an end time, and a destination. The destinations can be represented in any manner. In an implementation for the section below directed to a qualitative description of location history modeling, a destination is any specification of place and/or location. In an implementation for the section below directed to a quantitative description of location history modeling, it is considered that (1) destinations do not overlap (or, if they do, a protocol exists and can be invoked to resolve possible conflicts when an object can be construed to be in more than one destination) and (2) there are a finite number of destinations being analyzed (otherwise a matrix (e.g., the N×N matrix described below) involved in the location history modeling becomes infinite).

Stays and destinations may be acquired from raw location data in any manner. Examples of stay and destination acquisitions are described in a related patent application entitled "Parsing Location Histories" and having at least one common inventor as well as a common assignee. This related application, which is hereby incorporated by reference in its entirety herein, was assigned application Ser. No. 10/968,861 and filed on Oct. 19, 2004. After stays and destination have been acquired through any given mechanism, probabilistic models of location histories can be constructed as described in the following sections.

Modeling Location Histories Qualitatively

In certain described implementations, location history models can be used to condense, understand, and/or predict the movements of an object over a period of time. Location history modeling can enable different tasks to be performed. For example, an approximate or probabilistic estimate or guess can be made as to an object's location at a given time, even if no sensor-based location data is available for that time. Or, an approximate or probabilistic determination can be made as to whether a location history is from a given object (e.g., whether a given object made a location history). Also, a fake or fabricated location history can be generated for an object based on a location history model therefor. Additionally, future locations of an object can be predicted to some degree of accuracy using an object's location history. Location history models can also enable other tasks.

Two probabilistic model types for location histories are described herein: one type with first-order Markovian conditioning of current location on subsequent location (or current location on previous location) and one type without such first-order Markovian conditioning. Both model types provide value depending on the kinds of questions that are asked of the model.

Introduction to Location History Modeling and Production of a Location History

Figure 1:
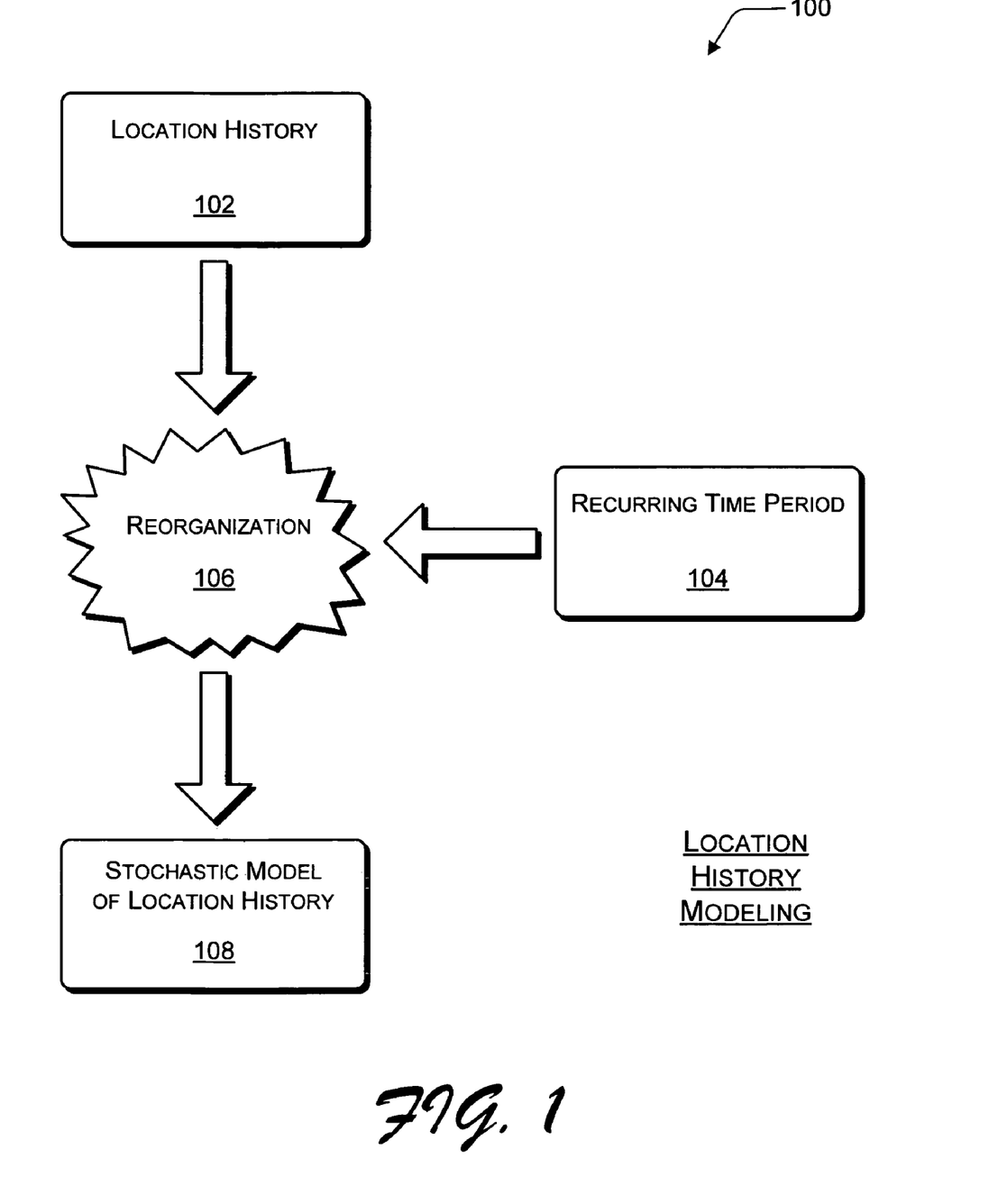
FIG. 1 illustrates an example production of a stochastic model of a location history from the location history data.

FIG. 1 illustrates an example production 100 of a stochastic model of a location history 108 from location history data 102. In order to have sufficient input data to create a stochastic model, time is divided into recurring time periods 104.

As illustrated, location history 102 undergoes a reorganization or conversion 106 by applying at least one recurring time period 104 thereto. By reorganizing or converting 106 location history 102 based on recurring time period 104, stochastic model of a location history 108 is produced. This reorganization 106 is described further herein below with particular reference to FIGS. 2 and 3, which are directed to an architecture model and model training, respectively.

In a described implementation, two recurring time periods 104 are utilized. These two recurring time periods 104 are an interval and a cycle. A cycle is a time period that repeats periodically. Each cycle is comprised of multiple intervals. The intervals and cycles are applied to location history data 102 such that a respective interval in one cycle corresponds to a respective interval in another cycle. For example, a third interval of any given cycle is considered to correspond to the third interval of each other cycle.

Location history data 102 may be comprised of raw location history data. In such a case, each location may be a place that is acquired (e.g., measured) at any given moment. Also, location history data 102 may be comprised of destinations clustered from raw location data. Alternatively, location history data 102 may be comprised of stays or destinations clustered from stays. For example, in the quantitative location history modeling section below, stays are the location of interest for location history data 102. Location history data 102 may also be comprised of historical location data in other formats.

In this qualitative location history modeling section, six subsections are presented below. These subsections are entitled "Model Architecture", "Model Training", "Evaluation of a Subject Location History with Model", "Object Location Prediction with Model", "Markovian Modifications", and "Fine Tunings and Elaborations".

Model Architecture

Figure 2:
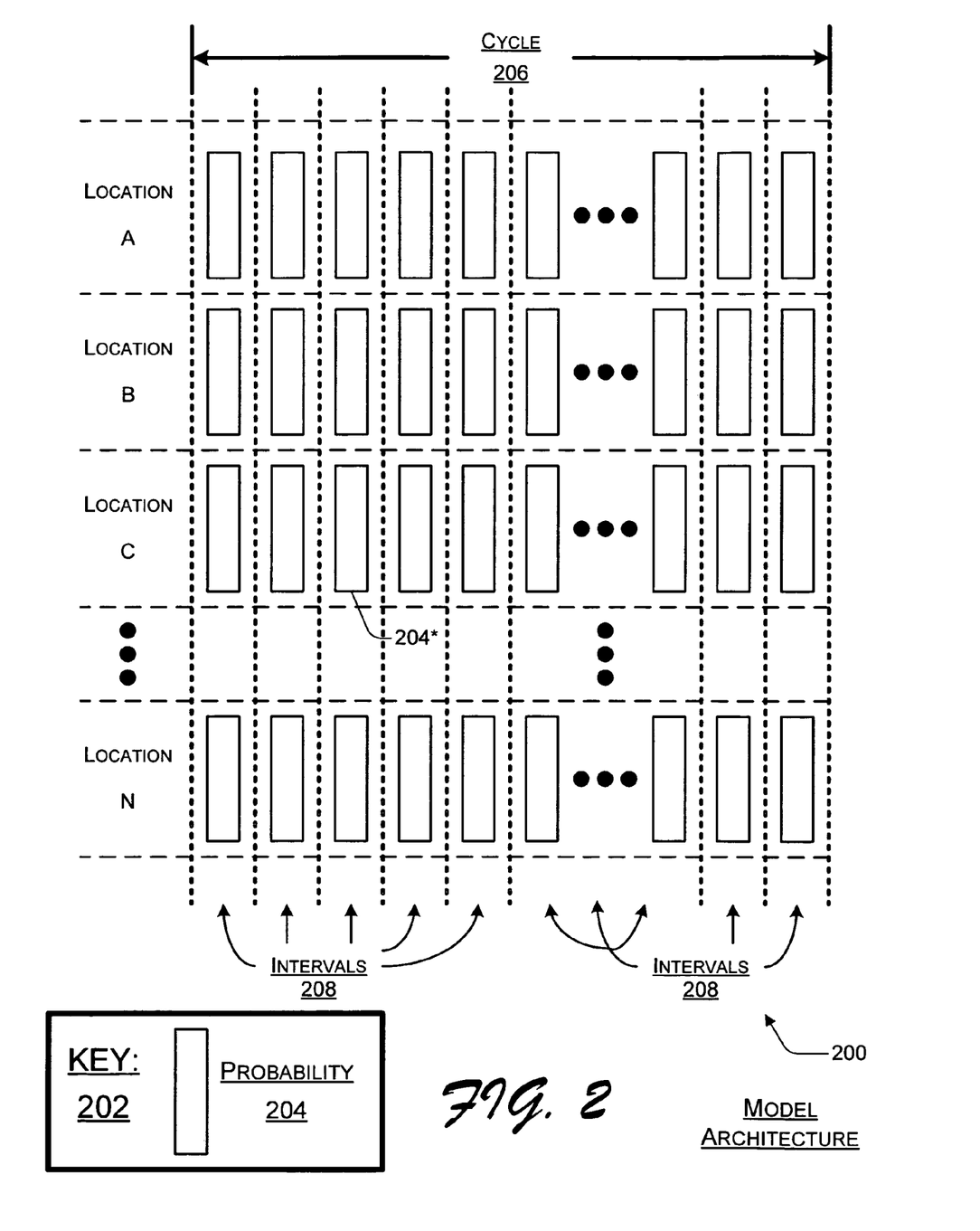
FIG. 2 illustrates example architecture for location history modeling.

FIG. 2 illustrates example architecture 200 for location history modeling. In a described implementation and as indicated by model architecture 200, time is divided into cycles 206 and intervals 208. For example, for a yearly cycle with daily intervals, there are 365 intervals per cycle that repeats annually. For a monthly cycle with daily intervals, there are approximately 30 intervals per cycle that repeats every month. For a weekly cycle with hourly intervals, there are 168 intervals per cycle that repeats each week. Other cycle 206 and interval 208 permutations may alternatively be employed depending on e.g. desired specificity.

As indicated by key 202, each vertical rectangle represents a probability 204. As illustrated, a target location history 102 includes "N" locations: location A, location B, location C . . . location N. Each location has an associated probability 204 for each interval 208 of cycle 206. Architecture model 200 effectively forms a matrix.

A given probability 204 represents the probability that the object of the target location history 102 is located at the associated location (A, B, C . . . N) during the corresponding interval 208. For example, probability 204* represents the probability that the object is present at location C during the third interval 208 of the designated cycle 206. An approach to attaining these probabilities 204 is described in the following subsection that is directed to training a location history model 108 in conjunction with application of a designated cycle 206 and interval 208.

Model Training

Figure 3:
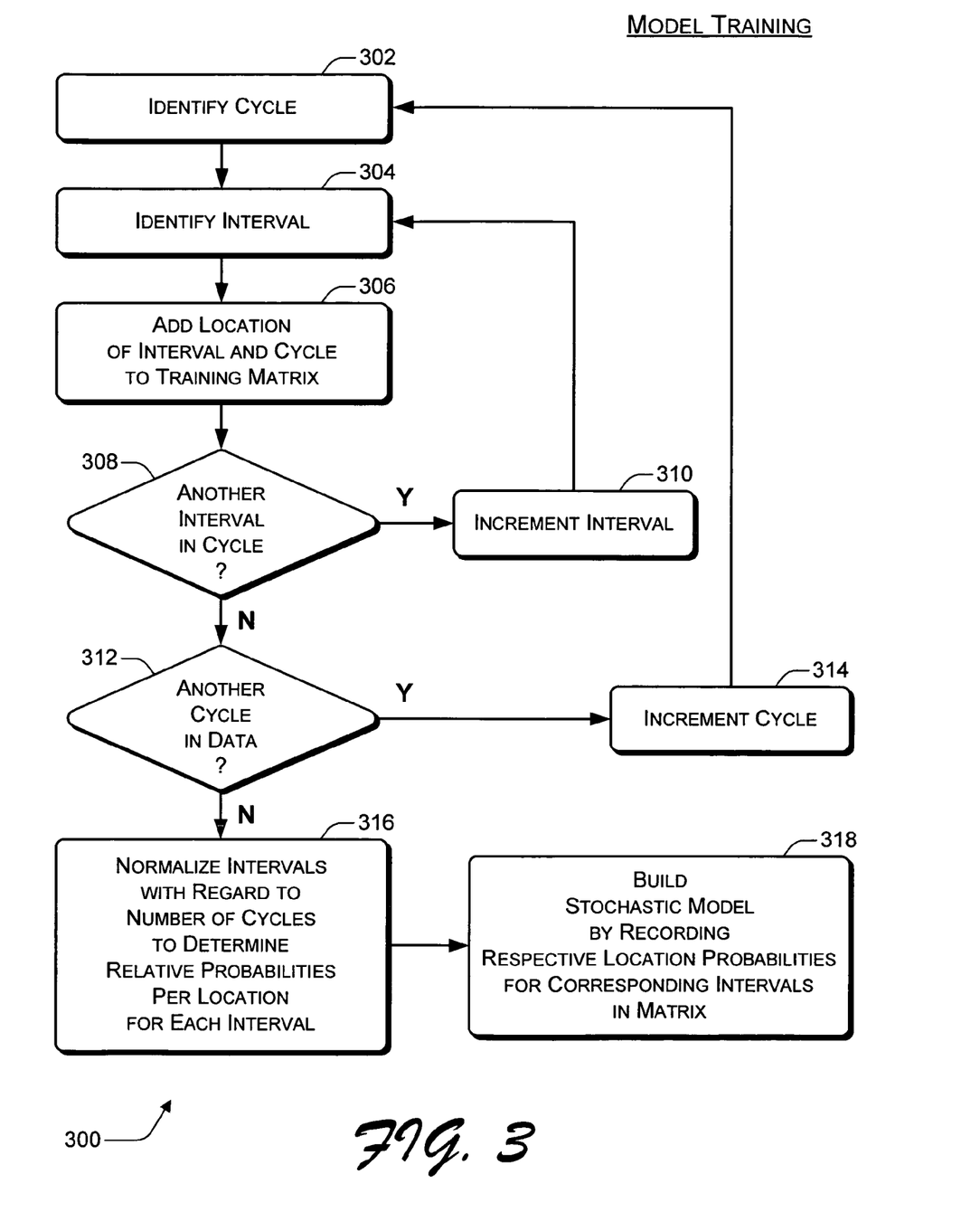
FIG. 3 is a flow diagram that illustrates an example of a method for training a location history model using data from a location history of an object.

FIG. 3 is a flow diagram 300 that illustrates an example of a method for training a location history model using data from a location history of an object. Flow diagram 300 includes nine (9) blocks 302-318. Although the actions of flow diagram 300 may be performed with different model architectures, FIGS. 1-2 are used in particular to illustrate certain aspects and examples of the method. The location history model training method of flow diagram 300 effectively applies two recurring time periods 104 to reorganize 106 a location history 102 and thereby produce a stochastic model of the location history 108.

At block 302, a cycle is identified. For example, a first or subsequent cycle 206 may be identified. At block 304, an interval is identified. For example, a first, middle, or final interval 208 may be identified. For any given current interval 208, the current interval has a previous interval and a subsequent interval that are adjacent thereto. Such distinctions are relevant when utilizing Markovian conditioning.

At block 306, a location of the identified interval and cycle are added to a training matrix. For example, if a $23^{rd}$ interval is being analyzed and this is the fourth cycle in which the object has been present at location C during the $23^{rd}$ interval, then an intermediate total of five is noted for location C in the $23^{rd}$ interval.

Blocks 308-314 enable the method of flow diagram 300 to iterate through each interval 208 of each cycle 206 of a target location history 102. Specifically, at block 308 it is determined if there is another interval to be analyzed in the current cycle. If yes, then the interval is incremented at block 310, and the method continues at block 304. If, on the other hand, all intervals of the current cycle have been analyzed (i.e., no, there is not another interval in the cycle as determined at block 308), then at block 312 it is determined if there is another cycle to be analyzed in the location history data. If there is another cycle, then the current cycle is incremented at block 314, and the method continues at block 302.

After each interval of each cycle has been analyzed for the location at which the object was present, the method continues at block 316. At block 316, interval totals are normalized with regard to the number of cycles in the location history data to determine relative probabilities per location for each interval. Continuing with the location C example used above for the $23^{rd}$ interval, assume that the total number of cycles in which the object was present at location C is eight and that 52 cycles of location history data 102 were analyzed. The normalized value or probability for location C during the $23^{rd}$ interval is 8/52 or (approximately) 0.15.

At block 318, a stochastic location history model is built by recording respective location probabilities of respective associated locations for corresponding intervals into a matrix model architecture. For example, the probability 0.15 is recorded in association with location C into the corresponding $23^{rd}$ interval of the cycle. The matrix that is built is a two-dimensional matrix having a total number of entries equal to the number of intervals per cycle times the total number of locations at which the object has been present. In one direction (e.g., horizontally as depicted in FIG. 2), the number of columns is equal to the number of intervals. In another direction (e.g., vertically as depicted in FIG. 2), the number of rows is equal to the number of locations. For example, with 168 (hourly) intervals per (weekly) cycle, there are 168 columns and "N" rows.

Evaluation of a Subject Location History with Model

Figure 4:
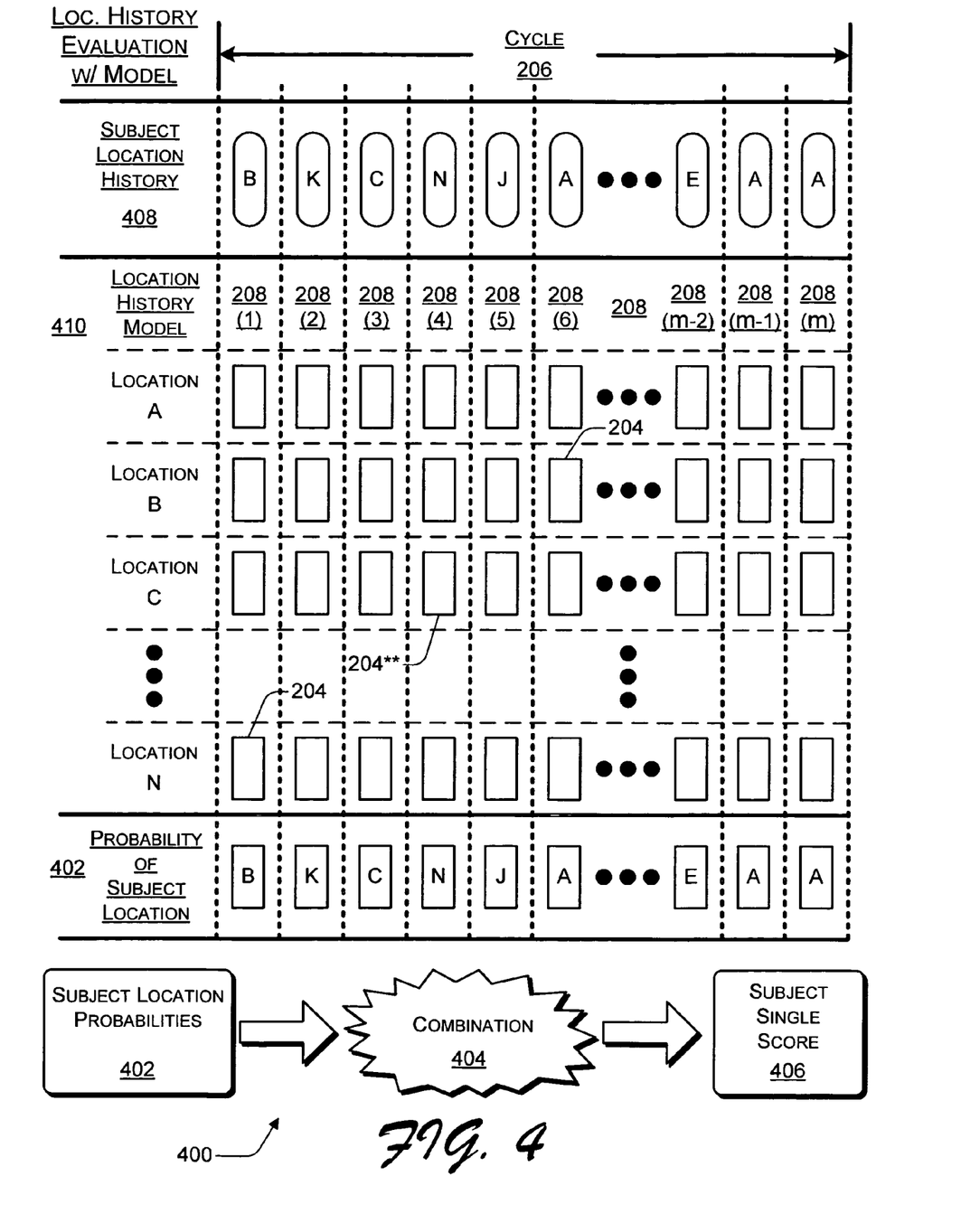
FIG. 4 illustrates an example evaluation of a subject location history with regard to a location history model.

FIG. 4 illustrates an example evaluation 400 of a subject location history 408 with regard to a location history model 410. Location history model 410 includes probabilities 204 (as introduced above with reference to FIG. 2) associated with locations A, B, C . . . N for multiple intervals 208(1 . . . m) of cycle 206 for a given object. Subject location history 408 is another location history that may or may not be for the same object. An example location history evaluation with model 400 facilitates a comparison between subject location history 408 and location history model 410 and/or a determination as to the likelihood that the object of location history model 410 also produced subject location history 408.

In a described implementation, subject location history 408 includes a location at which the relevant object was present for each interval 208 of a single cycle 206. In alternative implementation, the noted location may be the location having the highest probability for each interval 208 of multiple cycles 206. As illustrated, these locations are locations B, K, C, N, J, A . . . E, A, and A for the respective corresponding intervals 208(1, 2, 3, 4, 5, 6 . . . m-2, m-1, m).

The probabilities of the subject location 402 are determined using location history model 410 and subject location history 408. Specifically, for each interval 208, the location from subject location history 408 is extracted. This extracted location is then used to ascertain a probability associated with that extracted location for each interval 208 from location history model 410. For example, in the first interval 208(1), the tracked object was present at location B as indicated by subject location history 408. By accessing location history model 410 at the intersection of the first interval 208(1) (column) and location B (row), a probability associated with location B and corresponding to the first interval 208(1) may be ascertained from location history model 410.

The probability ascertained from location history model 410 is then inserted into the respective interval 208 in probabilities of the subject location 402. Accordingly, probabilities of the subject being in a given location are ascertained and used to fill out probabilities of the subject location 402. As illustrated from left to right in FIG. 4, these probabilities are associated with respective locations B, K, C, N, J, A . . . E, A, and A for the corresponding intervals 208(1 . . . m).

For evaluation 400 purposes, a single subject score 406 is produced from subject location probabilities 402 using some combination operation 404. Examples of possible combination operations 404 include a summing operation, a multiplying (product) operation, and so forth. More complex combination operations 404 may also be employed.

In a described implementation, combination operation 404 comprises a product operation in which each probability of subject location probabilities 402 is multiplied together to produce single subject score 406. Although multiplying probabilities (e.g., if expressed as a fraction of one) together likely produces a smallish number, it is the relative sizes of such single subject score products 406 that enable the comparisons, etc. of location history model evaluations 400.

Object Location Prediction with Model

Location history models 410 also enable some predictions within a determinable degree of accuracy. For example, from a location history model 410, it may be ascertained what is the most likely (or the second most likely, etc.) location at which an object is present for any given interval 208 of cycle 206. For example, if someone wishes to find/contact an object during the fourth interval 208(4) of the cycle 206, location history model 410 indicates that location C should be searched/investigated assuming that probability 204** is the highest probability for the fourth interval 208(4).

Figure 5:
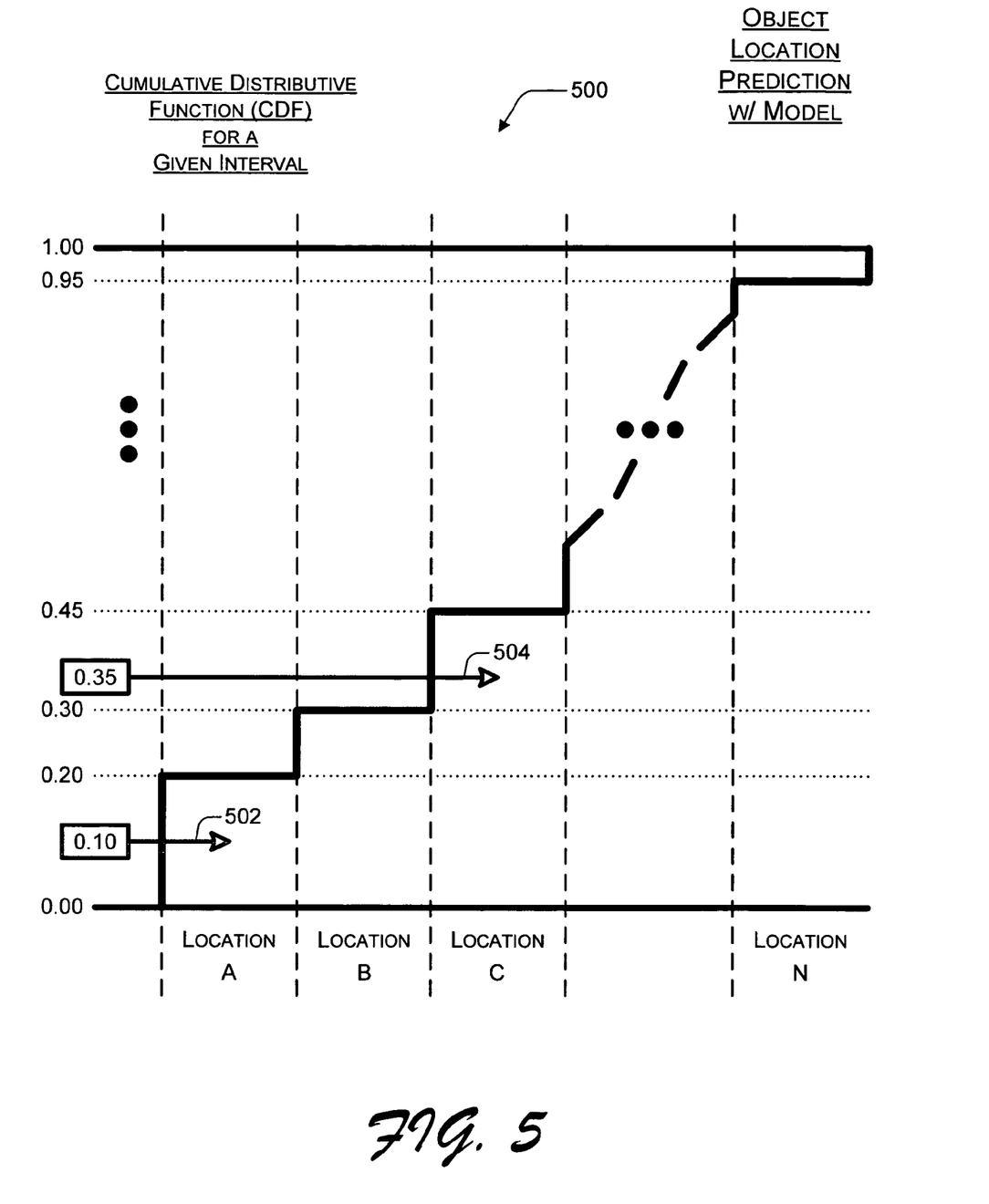
FIG. 5 illustrates an example predictive scheme for an object using a location history model of the object.

FIG. 5 illustrates an example predictive scheme 500 for an object using a location history model of the object. In a described implementation, a cumulative distributive function (CDF) is created for a given interval 208 of location history model 410 (of FIG. 4). A CDF is the result of accumulating different probabilities for a set of possibilities and producing a function that ranges from 0.00 to 1.00.

In this example for this given interval 208, location A is associated with a 0.20 probability, location B is associated with a 0.10 probability, location C is associated with a 0.15 probability . . . and location N is associated with a 0.05 probability. Accordingly, the illustrated CDF is associated with location A from 0.00 to 0.20 (or immediately below 0.20), with location B from 0.20 to 0.30, with location C from 0.30 to 0.45 . . . and with location N from 0.95 to 1.00.

To select a location probabilistically, a Monte Carlo or similar coin-toss-type simulation is performed using, e.g., a random number generator set to return a number from 0.00 to 1.00. The returned random number dictates which location is selected for each given interval 208. For example, if 0.10 is returned, then location A is selected for the given interval 208 as indicated at 502. And if 0.35 is returned, then location C is selected for the given interval 208 as indicated at 504.

For each interval 208 of the cycle 206 of a location history model 410, a CDF is created and a random simulation is performed. The resulting selected location may be recorded in a location history 102 format. When this prediction has been accomplished and the result has been recorded for each interval 208 (possibly for multiple cycles 206), a fake or constructed location history is begotten.

Markovian Modifications

In a Markovian implementation, transitional probabilities are involved. In other words, a location in a previous interval has a probabilistic effect on the location in a current interval. Involving such Markovian transitional probabilities complicates the location history model, but the underlying principles remain. Moreover, a Markovian flavored model can be superior in certain instances because an object's previous location tends to impact its (especially immediately) succeeding location. For example, an object at location B during a previous interval may be more likely to be at location B or another spatially proximate location in a current interval than a random other location. Or an object may tend to transition from location H to location B (home to business) every morning.

Figure 6:
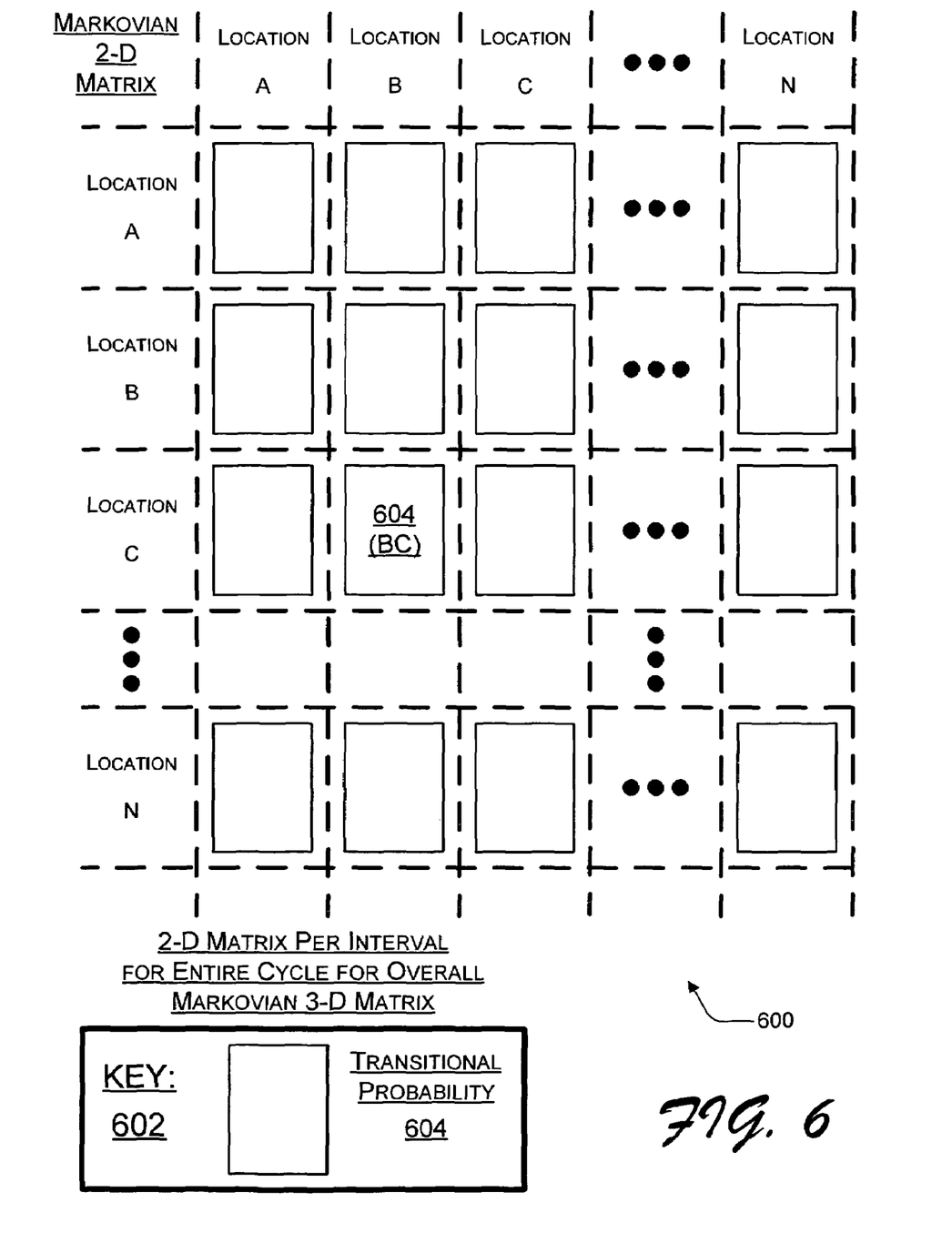
FIG. 6 is an example of a Markovian two-dimensional transitional probability matrix.

FIG. 6 is an example of a Markovian two-dimensional (2D) transitional probability matrix 600. Markovian training matrices and resulting location history models are three-dimensional (3D). Each 2D transitional probability matrix 600 is created for each interval 208 for a designated cycle 206. There is therefore an entire 2D matrix for each interval entry of a 1D interval-cycle matrix. With N locations and 168 intervals per cycle for example, there are N×N×168 total probability entries.

As indicated by key 602, each large rectangle represents a transitional probability 604. The 2D transitional probability matrix 600 includes N×N entries for the N locations, with each entry including a transitional probability 604 for the intersecting locations. For example, for transitional probability 604(BC), it represents a probability that the object is at location B at a particular (current) interval for which the 2-D matrix is associated given that the object was at location C in the previous interval. Alternatively, the horizontal row-vertical column conditional probability dependency may be switched.

The 2D transitional probability matrix 600 illustrates a model architecture for a Markovian implementation. Training a 2D transitional probability matrix 600 is similar to the description above. However, when adding a location (e.g., analogously to the action(s) for block 306) for a current interval, the location of the object in a previous interval is accounted. With reference to FIG. 6, the location of an object in a previous interval determines the row in which the occurrence is added to the location for the current interval.

For location history modeling evaluation with a Markovian implementation, the process is also analogous to the non-Markovian approach. However, when preparing the probabilities of the subject location 402 from a subject location history 408 and a Markovian location history model 410, a location of a previous interval is accounted for when ascertaining a transitional probability 604 by selecting a row of a 2D transitional probability matrix 600 of the location history model 410 responsive to the location of the previous interval. It requires an extra input (the location of the previous interval) and an additional lookup vector because of the additional $3^{rd}$ dimension with the Markovian matrices.

For location prediction with location history models in a Markovian implementation, a CDF is created for each row of the 2D transitional probability matrix 600 for each interval. In other words, for each "current interval" a CDF is created for each location at which an object may have been present during a "previous" interval. In the example described above, this could result in N×168 CDFs. Monte Carlo style simulations may otherwise be performed as described above. For these types of predictive tasks, experimentation indicates that Markovian stochastic location history models 108 usually outperform their non-Markovian counterparts.

Fine Tunings and Elaborations

Entries in location history model matrices can have many zero probabilities. For example, with 168 intervals and 20 locations, at least some of the 20 locations will likely not be visited by an object in at least some of the 168 intervals. These location-interval intersections are therefore assigned a zero (0.00) probability. This can create problems during analysis (e.g., when performing a product type combination operation 404). To ameliorate these situations, a relatively tiny but non-zero probability can be assigned to those location-interval intersections that would otherwise be zero. The remaining probabilities are accordingly normalized so that the probability for the total set of possibilities sums to one (1.00). For instance, if one location of the twenty locations has a probability of 1.00 and the other 19 are zero, the adjusted probabilities can be 0.9981 for the one location and 0.0001 for the other 19 locations.

The discussions above have largely assumed that there is one and only one location per interval and that the object is effectively at that location for the entire interval. Furthermore, transitions have also largely been ignored. However, stays may last for only part of an interval 208, stays may overlap an interval 208 change, there may be multiple transitions and thus multiple stays in a single interval, and so forth.

Nevertheless, these occurrences can be handled, especially if the original location history 102 is sufficiently rich and detailed. For example, even if a duration of the interval 208 spans an hour, the data may be accurate to tenths of an hour, minutes, and so forth. Hence, portions of an hour may be accounted for by using split ratios for each hour during the location history model matrix training prior to normalization (e.g., starting with the action(s) of block 306 and impacting the action(s) of block 316).

As a second alternative, a location at which an object is present for the greatest percentage of time for a given interval can be added to the matrix being trained (e.g., at block 306). As a third alternative, a particular moment at each interval 208 may be the moment that dictates which location is added to the matrix being trained. This moment may be, e.g., when intervals change, at the midpoint of each interval, and so forth. As a fourth alternative, separate probability sub-tables may be maintained to indicate the probability of multiple transitions within an interval. Other alternatives for handling real-world location transitions and stay durations may alternatively be employed.

With respect to travel time between two locations, a destination may be selected for inclusion in the training matrix based on a starting location, an ending location, the travel time (e.g., multiple intervals or intra-interval portions) may be split between the two locations, and so forth.

Modeling-Location Histories Quantitatively

This section describes implementations for the modeling of location histories from a quantitative perspective. However, the modeling of location histories as described herein is not limited to the specific quantitative implementations described in this section. The next two subsections describe some notation and establish assumptions for a described model. The subsections that follow thereafter describe an example model along with algorithms for training, estimation, and prediction.

Notation

The destination set, $D=\{d_i\}$, is the set of destinations (e.g., optionally as determined as described above), where $1 \leq i \leq n$ and $n=|D|$ denotes the total number of destinations.

Three different units of time are distinguished. A time instant, t, represents an instantaneous moment in time; if time is thought of as a real-valued entity of one dimension, a time instant represents a single point on the real number line. Next, for a given interval unit of time, δt, (e.g., an hour), a time interval, t, represents a half-open unit interval on the real number line, aligned to a standard calendar and clock. For example, for δt equal to an hour, t might be a time interval starting at 18:00 UTC today and going up to, but not including 19:00 UTC. Finally, a recurring time interval, τ, is the set of time intervals that represents a regularly recurring interval of time. Continuing the example, τ might be the set of times occurring between 18:00 and 19:00, regardless of date. A set of non-intersecting, recurring time intervals that covers all relevant times is denoted, $J=\{\tau_k\}$, for $1 \leq k \leq m$, with $m=|J|$ indicating the number of recurring time intervals required to cover all relevant times.

The granularity, δt, of a recurring time interval and the period with which it recurs (i.e., the cycle length) is something that is decided for a particular model a priori. Thus, it might be selected for a particular model that δt represents an hour and recurring time intervals cycle each day (in which case, m=24) or that each hour of the week are different recurring intervals (m=168). If so, then $t_p \subset \tau_k$ if $t_p$ represents the particular hour between 18:00 and 19:00 on e.g. Sep. 30, 2003, and $\tau_k$ represents the recurring time interval 18:00-19:00.

Additionally, a function, τ(t), is defined that extracts the recurring time interval that contains a time instance: $\tau(t_p)=\tau_k$, if and only if $t_p \in \tau_k$. With a minor laxness of notation, the following is also utilized: $\tau(t_p)=\tau_k$, if and only if $t_p \subset \tau_k$.

Model Assumptions

Both of the location history models described herein, in their strictest sense, adhere to the following two assumptions: First, at the beginning of a given time interval, an object is at one destination. Second, during any given time interval, an object makes one transition between destinations. However, a transition may occur from a destination to itself (a so-called "self-transition").

These are arguably not ideal assumptions. For example, the possibility of multiple transitions occurring within a single time interval is not explicitly modeled by the strictest quantitative algorithms described herein. These assumptions are utilized, however, to strike a compromise between allowing arbitrary transitions and the expressive power of the model—a compromise that does not require unreasonable amounts of data to train.

Based on the above assumptions, the following probability tables are defined in a manner analogous to Hidden Markov Models (HMM). A difference from the standard HMM formulation is that time-dependence is incorporated into the model, where transition probabilities are conditioned on recurring time intervals, rather than being fixed regardless of the time. This is an intentional design decision that enables the capturing of cyclical behavior that is, for example, dependent on the time-of-day. With this modification, the fact that it is far more likely that a person is traveling from home to office at 8 am than at 4 am can be modeled.

The probability of the object starting time interval $\tau_k$ at destination $d_i$ is represented by a matrix of probabilities, $\Pi=\{\pi(d_i, \tau_k)\}$ where $$\pi(d_i, \tau_k) = Pr(d=d_i \text{ at the start of } \tau_k) \quad (1)$$

and $$\pi(d_i, t_p) = \pi(d_i, \tau_k), \text{ for } t_p \in \tau_k \quad (2)$$

such that, $$\sum_{i=1}^{n} \pi(d_i, \tau_k) = 1.$$

Next, the probability that the object makes a transition from destination $d_i$ to $d_j$ during interval $\tau_k$ is given by a table, $A=\{a(d_i, d_j, \tau_k)\}$, $$a(d_i, d_j, \tau_k) = Pr(d=d_j) \text{ where at the start of } \tau_{k+1} | d=d_i \text{ at the start of } \tau_k \quad (3)$$

such that, $$\sum_{i=1}^{n} a(d_i, d_j, \tau_k) = 1.$$

Also, $a(d_i, d_j, t_p) = a(d_i, d_j, \tau_k)$ where $t_p \in \tau_k$.

To complete the HMM analogy, an observation probability is included. $B=\{b(d_i, d_j)\}$ represents the probability of observing that the object is at destination $d_j$, given that the object is actually at destination $d_i$, with $$b(d_i, d_j) = Pr(d^{observed} = d_j | d^{actual} = d_i) \quad (4)$$

Together as $\lambda=(\Pi, A, B)$, these tables represent a probabilistic generative model of location for the object being modeled. Once the parameters are learned, this model can be used to solve problems such as finding the most likely destination occupied at a particular time, determining the relative likelihood of a location history sequence, or stochastically generating a location history sequence.

Training the Model

Algorithms for learning model parameters λ from training data are described in this section. The example training data used includes a set of stays, $S=\{s_i\}$, as extracted from raw data in a manner as described above in the parsing location history sections. Accordingly, each stay, s, is a 3-tuple containing a start time, an end time, and a destination: $s_i=(d_i, t_i^{start}, t_i^{end})$.

Computing Π

To compute Π, the number of occurrences in the training data where the object starts a recurring time interval in a particular destination is counted. The resulting total counts are then normalized over the counted training data for that recurring interval. Table 1 below shows pseudocode for an example algorithm.

TABLE 1

Algorithm for computing Π, the prior probabilities of being at a destination at a given recurring time interval.

Input: set of stays, $S = \{s_i\}$
Output: probability table, $\Pi = \{\pi(d_i, \tau_k)\}$
Initialize: count($d_i, \tau_k$) ← 0, for $1 \leq i \leq n$ and $1 \leq k \leq m$
// count
for each $s_i \in S$
  if $\tau(t_i^{start}) = \tau(t_i^{end})$ and $t_i^{end} - t_i^{start} < \delta t$
    continue
  else
    for t ← Ceiling($t_i^{start}$): $t_i^{end}$ : δt
      count($d^{(i)}, \tau(t)$) ← count($d^{(i)}, \tau(t)$) + 1;
    end
end
// normalize

TABLE 1-continued

Algorithm for computing Π, the prior probabilities of being at a destination at a given recurring time interval.

for each i, k in $1 \leq i \leq n$ and $1 \leq k \leq m$ $$\pi(d_i, \tau_k) \leftarrow \text{count}(d_i, \tau_k) \Big/ \sum_j \text{count}(d_j, \tau_k);$$

end

Computing A

To compute A, the number of occurrences in the training data where the object makes a transition from a particular destination to another destination (or itself) during a recurring time interval is counted. The resulting total count is normalized over the counted training data for that recurring interval. An example of this algorithm is shown in Table 2 below.

TABLE 2

Algorithm for computing A, the probability table showing the likelihood of transition between destinations at a given recurring time interval.

Input: S = {$s_i$}
Output: probability table, A = {$a(d_i, d_j, \tau_k)$}
Initialize: count($d_i, d_j, \tau_k$) ← 0, for $1 \leq i, j \leq n$ and $1 \leq k \leq m$
for each $s_i \in S$
    // count self-transitions
    if $\tau(t_i^{start}) = \tau(t_i^{end})$ and $t_i^{end} - t_i^{start} < \delta t$
        continue
    else
        for t ← Ceiling($t_i^{start}$): $t_i^{end}$ : δt
            count($d^{(i)}, d^{(i)}, \tau(t)$) ← count($d^{(i)}, d^{(i)}, \tau(t)$) + 1;
        end
    end
    // count other transitions
    if $i \neq |S|$ and $\tau(t_i^{end}) \neq \tau(t_{i+1}^{start})$
        t = ceiling($t_{i+1}^{start}$)
        count($d^{(i)}, d^{(i+1)}, \tau(t)$) ← count($d^{(i)}, d^{(i+1)}, \tau(t)$) + 1;
    end
end
// normalize
for each i, j, k in $1 \leq i, j \leq n$ and $1 \leq k \leq m$ $$a(d_i, d_j, \tau_k) \leftarrow \text{count}(d_i, d_j, \tau_k) \Big/ \sum_j \text{count}(d_i, d_j, \tau_k);$$

End

Location History Analysis

The location history model, λ, can now be used to estimate the relative likelihood of a new location history, $\tilde{H}=\{d(t_u)\}$, defined over u∈ [start, finish]. Two different processes, a Markovian and a non-Markovian one, for doing this are described below.

Non-Markovian Solution

The probability of the location history is determined by computing the joint probability $\pi(d(t_u), t_u)$ and $b(d(t_u), d(t_u))$ from time $t_{start}$ to time $t_{finish}$, and marginalizing (summing) the joint probabilities over all possible location history sequences. This can be represented by the following equation:

$$Pr_\pi(\tilde{H}|\lambda) = \sum_{\tilde{H} \in \{d_{h_{start}}, \ldots, d_{h_{finish}}\}} \prod_{u=start}^{finish} \pi(d_{h_u}, t_u) b(d(t_u), d_{h_u}) \quad (5)$$

If observations are accurate, this reduces to $$Pr_\pi(\tilde{H}|\lambda) = \prod_{u=start}^{finish} \pi(d(t_u), t_u) \quad (6)$$

Being non-Markovian, this approach assumes that there is no conditional dependency of state between time intervals.

Markovian Solution

Another method of determining the probability of a location history is by computing the joint probability of the observation sequence and the state sequence and marginalizing over all possible location history sequences:

$$Pr_A(\tilde{H}|\lambda) = \sum_{\tilde{H} \in \{d_{h_{start}}, \ldots, d_{h_{finish}}\}} \pi(d_{h_s}, t_s) \cdot b(d(t_u), d_{h_s}) \quad (7)$$
$$\prod_{u=start}^{finish-1} a(d_{h_{u+1}}, d_{h_u}, t_u) \cdot b(d(t_{u+1}), d_{h_{u+1}})$$

This reduces to $$Pr_A(\tilde{H}|\lambda) = \pi(d(t_s), t_s) \prod_{u=start}^{finish-1} a(d(t_{u+1}), d(t_u), t_u)$$

if observations are accurate. This approach does use the transition probabilities A. Being Markovian, it assumes that the object's destination at a (current) time interval is conditionally dependent on its destination at the (e.g., at least immediately) previous time interval. This is equivalent to the standard "forward algorithm" used to evaluate the probability of a sequence of observations in an HMM, but with the above-noted modification for time-dependent transition probabilities.

Whichever method is used, the output is a true probability in the strict sense, but only given the assumptions of the respective estimates. In reality, probabilities of events over time intervals are ill-defined. For instance, the probability of a particular event approaches zero as the event is sampled over shorter and shorter sub-intervals. Thus, these values are more meaningful when interpreted as relative likelihoods between events observed using the same interval unit. For example, the relative likelihoods of two location histories of a week's length with δt equal to one hour can be compared, and their relative rarity can be judged. Furthermore, thresholds for a history can also be set dependent on the length of the history to determine whether an input history appears normal or abnormal. Finally, given multiple models, $\lambda_i$, it can be determined which model better explains a given history by computing $$\arg\max_i Pr(\tilde{H}|\lambda_i).$$

Stochastic Generation

Using the model parameters, λ, a location history $H_{gen}=\{d(t_u)\}$ for u∈ [start, finish], where $d(t_u)$ is the destination occupied at time interval $t_u$, can be generated. Two methods for generating location histories stochastically are described below.

In the first method, the Π parameters are used. Random samples are attained from the set of destinations for each time interval without conditional dependence between time intervals. Destinations are chosen such that $$Pr(d(t_u) = d_i) \propto \sum_j \pi(d_j, t_u) b(d_j, d_i) \qquad (9)$$

In practice, this can be accomplished with a basic Monte Carlo "coin-tossing" process to generate an "actual" destination, $d_j$, using π, which is then followed by another coin toss to determine the observed destination, $d_i$, using B. This approach simplifies to a single coin toss (e.g., using a random number generator) per time interval in the case where observations of destinations are noiseless.

In the second method, a full Markov model is utilized, and a similar Monte Carlo sampling is performed using the transition probabilities, A, except for the first time interval. Thus, $$Pr(d(t^{start}) = d_i) \propto \sum_j \pi(d_j, t^{start}) b(d_j, d_i)$$

as before for $t=t_{start}$, but $$Pr(d(t_u) = d_i \mid d(t_{u-1}) = d_k) \propto \sum_j A(d_k, d_j, t^{start}) b(d_j, d_i) \qquad (11)$$

for the remaining time intervals. This can also be implemented in practice as a relatively simple series of Monte Carlo coin tosses.

Applications with Location Histories

Several examples of applications with location history models are provided in this section. These applications may be effectuated and/or implemented with raw location data, processed location data, location history models, and so forth.

Probabilistic location estimation: The models allow guessing or estimating of an object's location for a particular time, even when no current concrete data is available.

Fusion of location estimates: Using well-established techniques for combining probabilistic information, estimates made by these models can be fused with location estimates from sensor data.

Location-history simulation: The models can generate location histories that appear typical for the object in question. In some scenarios, these simulated location histories can be substituted for an object's actual location history (e.g., to protect privacy or to run additional simulations).

Optimal scheduling: The models can be used to generate probabilistically optimal schedules for travel paths or appointments. For example, given the location-history model for a traveling salesperson and a number of new sites to visit, the salesperson's next round of site visits can be scheduled to minimize the likely distance traveled. Another example is incorporating the location histories of more than one party to schedule optimal times and locations for meetings.

Transition analysis: Entries from a set of Markovian models for different objects can be directly extracted or summed and normalized to indicate transition probabilities from one destination to another. This can help determine what routes might require more maintenance, what sites are most frequently visited, etc., as well as time-dependent versions of these quantities (e.g., what is the most likely next destination from destination A, at 3 pm on a Monday?).

Clique analysis: A set of destinations may form a "clique" where objects that visit those destinations tend to stay within the set. By analyzing a set of Markovian models and their transition matrices, these destination cliques can be identified.

The devices, actions, aspects, features, algorithms, procedures, modules, components, etc. of FIGS. 1-6 are illustrated in diagrams that are divided into multiple blocks. However, the order, interconnections, interrelationships, layout, etc. in which FIGS. 1-6 are described and/or shown is not intended to be construed as a limitation, and any number of the blocks can be modified, combined, rearranged, augmented, omitted, etc. in any manner to implement one or more systems, methods, devices, procedures, media, apparatuses, arrangements, etc. for modeling location histories. Furthermore, although the description herein includes references to specific implementations (including a general device of FIG. 7), the illustrated and/or described implementations can be implemented in any suitable hardware, software, firmware, or combination thereof and using any suitable raw location data format(s), stay and destination data structure(s), threshold value(s), modeling equation(s), transitional probability order(s), architecture model(s), and so forth.

Example Operating Environment for Computer or Other Device

Figure 7:
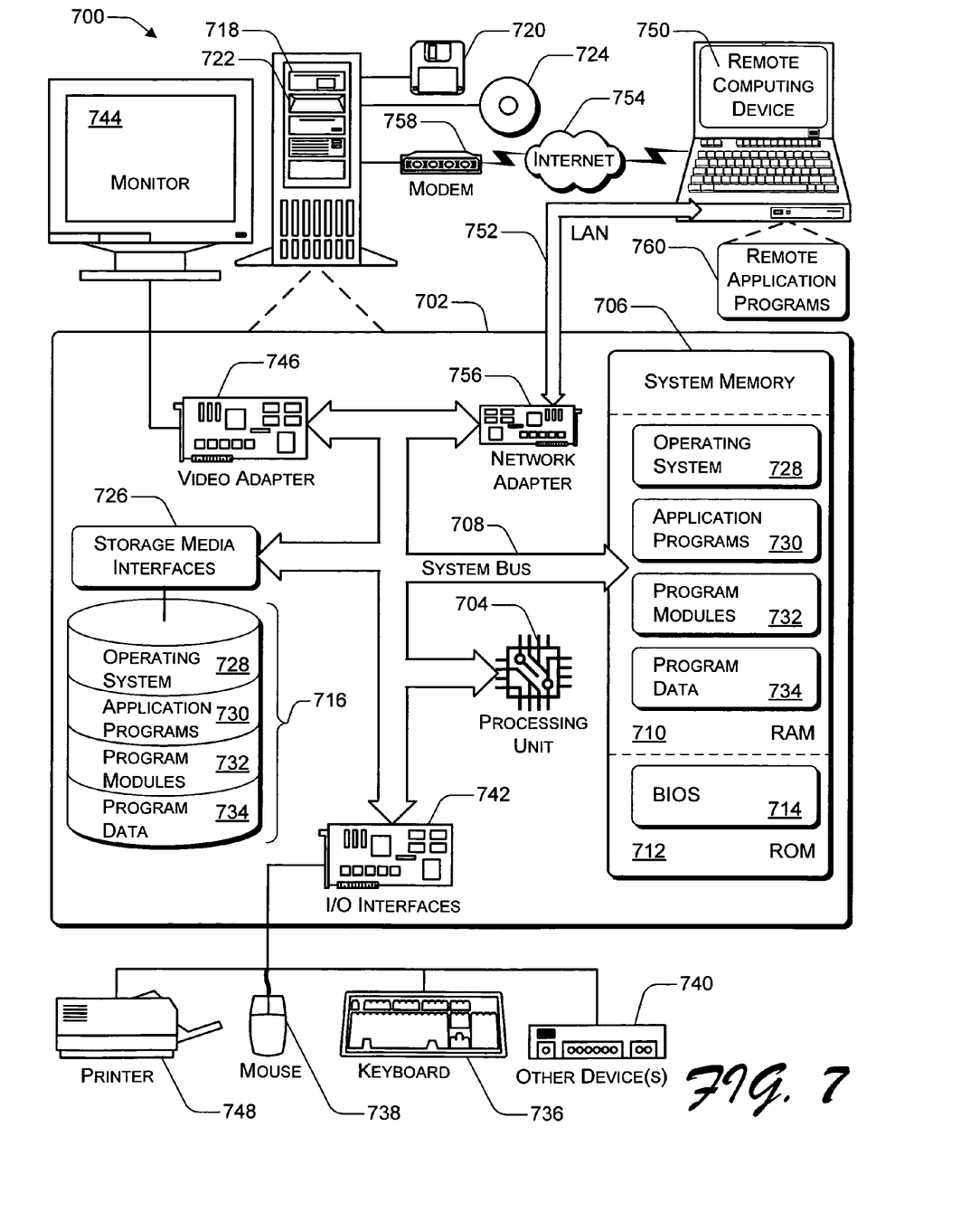
FIG. 7 illustrates an example of a computing (or general device) operating environment that is capable of (wholly or partially) implementing at least one aspect of modeling location histories as described herein.

FIG. 7 illustrates an example computing (or general device) operating environment 700 that is capable of (fully or partially) implementing at least one system, device, apparatus, component, arrangement, protocol, approach, method, procedure, media, API, some combination thereof, etc. for modeling location histories as described herein. Operating environment 700 may be utilized in the computer and network architectures described below.

Example operating environment 700 is only one example of an environment and is not intended to suggest any limitation as to the scope of use or functionality of the applicable device (including computer, network node, entertainment device, mobile appliance, general electronic device, etc.) architectures. Neither should operating environment 700 (or the devices thereof) be interpreted as having any dependency or requirement relating to any one or to any combination of components as illustrated in FIG. 7.

Additionally, location history modeling may be implemented with numerous other general purpose or special purpose device (including computing system) environments or configurations. Examples of well known devices, systems, environments, and/or configurations that may be suitable for use include, but are not limited to, personal computers, server computers, thin clients, thick clients, personal digital assistants (PDAs) or mobile telephones, watches, handheld or laptop devices, multiprocessor systems, microprocessor-based systems, set-top boxes, programmable consumer electronics, video game machines, game consoles, portable or handheld gaming units, network PCs, videoconferencing equipment, minicomputers, mainframe computers, network nodes, distributed or multi-processing computing environments that include any of the above systems or devices, some combination thereof, and so forth.

Implementations for modeling location histories may be described in the general context of processor-executable instructions. Generally, processor-executable instructions include routines, programs, protocols, objects, interfaces, components, data structures, etc. that perform and/or enable particular tasks and/or implement particular abstract data types. Modeling location histories, as described in certain implementations herein, may also be practiced in distributed processing environments where tasks are performed by remotely-linked processing devices that are connected through a communications link and/or network. Especially but not exclusively in a distributed computing environment, processor-executable instructions may be located in separate storage media, executed by different processors.

Example operating environment 700 includes a general-purpose computing device in the form of a computer 702, which may comprise any (e.g., electronic) device with computing/processing capabilities. The components of computer 702 may include, but are not limited to, one or more processors or processing units 704, a system memory 706, and a system bus 708 that couples various system components including processor 704 to system memory 706.

Processors 704 are not limited by the materials from which they are formed or the processing mechanisms employed therein. For example, processors 704 may be comprised of semiconductor(s) and/or transistors (e.g., electronic integrated circuits (ICs)). In such a context, processor-executable instructions may be electronically-executable instructions. Alternatively, the mechanisms of or for processors 704, and thus of or for computer 702, may include, but are not limited to, quantum computing, optical computing, mechanical computing (e.g., using nanotechnology), and so forth.

System bus 708 represents one or more of any of many types of wired or wireless bus structures, including a memory bus or memory controller, a point-to-point connection, a switching fabric, a peripheral bus, an accelerated graphics port, and a processor or local bus using any of a variety of bus architectures. By way of example, such architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnects (PCI) bus also known as a Mezzanine bus, some combination thereof, and so forth.

Computer 702 typically includes a variety of processor-accessible media. Such media may be any available media that is accessible by computer 702 or another (e.g., electronic) device, and it includes both volatile and non-volatile media, removable and non-removable media, and storage and transmission media.

System memory 706 includes processor-accessible storage media in the form of volatile memory, such as random access memory (RAM) 710, and/or non-volatile memory, such as read only memory (ROM) 712. A basic input/output system (BIOS) 714, containing the basic routines that help to transfer information between elements within computer 702, such as during start-up, is typically stored in ROM 712. RAM 710 typically contains data and/or program modules/instructions that are immediately accessible to and/or being presently operated on by processing unit 704.

Computer 702 may also include other removable/non-removable and/or volatile/non-volatile storage media. By way of example, FIG. 7 illustrates a hard disk drive or disk drive array 716 for reading from and writing to a (typically) non-removable, non-volatile magnetic media (not separately shown); a magnetic disk drive 718 for reading from and writing to a (typically) removable, non-volatile magnetic disk 720 (e.g., a "floppy disk"); and an optical disk drive 722 for reading from and/or writing to a (typically) removable, non-volatile optical disk 724 such as a CD, DVD, or other optical media. Hard disk drive 716, magnetic disk drive 718, and optical disk drive 722 are each connected to system bus 708 by one or more storage media interfaces 726. Alternatively, hard disk drive 716, magnetic disk drive 718, and optical disk drive 722 may be connected to system bus 708 by one or more other separate or combined interfaces (not shown).

The disk drives and their associated processor-accessible media provide non-volatile storage of processor-executable instructions, such as data structures, program modules, and other data for computer 702. Although example computer 702 illustrates a hard disk 716, a removable magnetic disk 720, and a removable optical disk 724, it is to be appreciated that other types of processor-accessible media may store instructions that are accessible by a device, such as magnetic cassettes or other magnetic storage devices, flash memory, compact disks (CDs), digital versatile disks (DVDs) or other optical storage, RAM, ROM, electrically-erasable programmable read-only memories (EEPROM), and so forth. Such media may also include so-called special purpose or hard-wired IC chips. In other words, any processor-accessible media may be utilized to realize the storage media of the example operating environment 700.

Any number of program modules (or other units or sets of processor-executable instructions) may be stored on hard disk 716, magnetic disk 720, optical disk 724, ROM 712, and/or RAM 710, including by way of general example, an operating system 728, one or more application programs 730, other program modules 732, and program data 734. These processor-executable instructions may include, for example, one or more of a raw location history data structure, a stays and/or destinations data structure(s), a program/module that produces or trains a location history model from a location history, a program/module that performs evaluations, predictions, etc. using a location history model, and so forth.

A user may enter commands and/or information into computer 702 via input devices such as a keyboard 736 and a pointing device 738 (e.g., a "mouse"). Other input devices 740 (not shown specifically) may include a microphone, joystick, game pad, satellite dish, serial port, video camera, scanner, and/or the like. These and other input devices are connected to processing unit 704 via input/output interfaces 742 that are coupled to system bus 708. However, input devices and/or output devices may instead be connected by other interface and bus structures, such as a parallel port, a game port, a universal serial bus (USB) port, an infrared port, an IEEE 1394 ("Firewire") interface, an IEEE 802.11 wireless interface, a Bluetooth® wireless interface, and so forth.

A monitor/view screen 744 or other type of display device may also be connected to system bus 708 via an interface, such as a video adapter 746. Video adapter 746 (or another component) may be or may include a graphics card for processing graphics-intensive calculations and for handling demanding display requirements. Typically, a graphics card includes a graphics processing unit (GPU), video RAM (VRAM), etc. to facilitate the expeditious display of graphics and performance of graphics operations. In addition to monitor 744, other output peripheral devices may include components such as speakers (not shown) and a printer 748, which may be connected to computer 702 via input/output interfaces 742.

Computer 702 may operate in a networked environment using logical connections to one or more remote computers, such as a remote computing device 750. By way of example, remote computing device 750 may be a peripheral device, a personal computer, a portable computer (e.g., laptop computer, tablet computer, PDA, mobile station, etc.), a palm or pocket-sized computer, a watch, a gaming device, a server, a router, a network computer, a peer device, another network node, or another device type as listed above, and so forth. However, remote computing device 750 is illustrated as a portable computer that may include many or all of the elements and features described herein with respect to computer 702.

Logical connections between computer 702 and remote computer 750 are depicted as a local area network (LAN) 752 and a general wide area network (WAN) 754. Such networking environments are commonplace in offices, enterprise-wide computer networks, intranets, the Internet, fixed and mobile telephone networks, ad-hoc and infrastructure wireless networks, mesh networks, other wireless networks, gaming networks, some combination thereof, and so forth. Such networks and logical and physical communications connections are additional examples of transmission media.

When implemented in a LAN networking environment, computer 702 is usually connected to LAN 752 via a network interface or adapter 756. When implemented in a WAN networking environment, computer 702 typically includes a modem 758 or other component for establishing communications over WAN 754. Modem 758, which may be internal or external to computer 702, may be connected to system bus 708 via input/output interfaces 742 or any other appropriate mechanism(s). It is to be appreciated that the illustrated network connections are examples and that other manners for establishing communication link(s) between computers 702 and 750 may be employed.

In a networked environment, such as that illustrated with operating environment 700, program modules or other instructions that are depicted relative to computer 702, or portions thereof, may be fully or partially stored in a remote media storage device. By way of example, remote application programs 760 reside on a memory component of remote computer 750 but may be usable or otherwise accessible via computer 702. Also, for purposes of illustration, application programs 730 and other processor-executable instructions such as operating system 728 are illustrated herein as discrete blocks, but it is recognized that such programs, components, and other instructions reside at various times in different storage components of computing device 702 (and/or remote computing device 750) and are executed by processor(s) 704 of computer 702 (and/or those of remote computing device 750).

Although systems, media, devices, methods, procedures, apparatuses, techniques, schemes, approaches, procedures, arrangements, and other implementations have been described in language specific to structural, logical, algorithmic, and functional features and/or diagrams, it is to be understood that the invention defined in the appended claims is not necessarily limited to the specific features or diagrams described. Rather, the specific features and diagrams are disclosed as exemplary forms of implementing the claimed invention.

What is claimed is:

1. An article of manufacture comprising:
    a storage medium; and
    a plurality of executable instructions stored on the storage medium that, when executed, direct a device to convert a location history to a stochastic model of the location history by applying at least one recurring time period to the location history, the recurring time period being divided into a number of time intervals, the stochastic model comprising a multi-dimensional matrix that includes multiple entries each corresponding to a combination of one of the time intervals and one of multiple locations, each entry including at least one probability that an object is present at the corresponding one of the locations during the one of the time intervals, the probability being calculated by dividing a total number of times that the location history shows the object as being at the corresponding one of the multiple locations during the corresponding one of the time intervals by a total number of recurrences of the time period.

2. The article of claim 1, wherein the at least one recurring time period comprises a cycle, the cycle periodically repeating.

3. The article of claim 1, wherein the multi-dimensional matrix is a two-dimensional matrix.

4. The article of claim 1, wherein the instructions, when executed, direct the device to perform the conversion by training the stochastic model using data from the location history.

5. The article of claim 4, wherein the data from the location history comprises at least one of stays or destinations.

6. The article of claim 4, wherein the data from the location history comprises destinations clustered from stays.

7. The article of claim 4, wherein the instructions, when executed, direct the device to effectuate the training by traversing each respective time interval of multiple recurring time periods of data from the location history and adding each respective corresponding location to a training matrix.

8. The article of claim 7, wherein the instructions, when executed, direct the device to further effectuate the training by normalizing each interval with regard to the total number of recurring time periods of the multiple recurring time periods to determine relative probabilities per corresponding location for each interval.

9. The article of claim 4, wherein the instructions, when executed, direct the device to effectuate the training without using transitional probabilities.

10. The article of claim 4, wherein the instructions, when executed, direct the device to effectuate the training by accounting for a location of a previous interval when determining a probability of a location of a current interval.

11. The article of claim 1, wherein the stochastic model comprises a three-dimensional matrix; the three dimensions of the three-dimensional matrix comprising intervals, locations for a previous interval, and locations for a current interval.

12. The article of claim 1, wherein the instructions, when executed, direct the device to perform an evaluation of a subject location history using the stochastic model.

13. The article of claim 12, wherein the instructions, when executed, direct the device to effectuate the evaluation by ascertaining a respective probability for each respective interval of a cycle based on a corresponding location of an object extracted from the subject location history.

14. The article of claim 13, wherein the instructions, when executed, direct the device to further effectuate the evaluation by performing a combination operation on the ascertained respective probabilities for each respective interval of the cycle from the subject location history.

15. The article of claim 1, wherein the instructions, when executed, direct the device to perform an object location prediction using the stochastic model.

16. The article of claim 1, wherein the instructions, when executed, direct the device to construct a fake location history using the stochastic model.

17. The article of claim 16, wherein the instructions, when executed, direct the device to effectuate the construction of the fake location history by creating cumulative distributive functions (CDFs) utilizing the stochastic model and by running Monte Carlo style simulations using the CDFs.

18. A system for modeling location histories, the system comprising:
- a processor;
- memory coupled to the processor;
- architecture means for architecting a stochastic model of a location history; and
- training means for training the stochastic model from the location history by applying at least one recurring time period to the location history, the recurring time period being divided into a number of time intervals, the stochastic model comprising a multi-dimensional matrix that includes multiple entries each corresponding to a combination of one of the time intervals and one of multiple locations, each entry including at least one probability that an object is present at the corresponding one of the location during the one of the time intervals, the probability being calculated by dividing a total number of times that the location history shows the object as being at the corresponding one of the multiple locations during the corresponding one of the time intervals by a total number of recurrences of the time period.

19. The system as recited in claim 18, further comprising:
evaluation means for evaluating a subject location history with regard to the stochastic model of the location history.

20. The system as recited in claim 18, further comprising:
prediction means for predicting a location of an object during at least one time interval of a time period utilizing the stochastic model of the location history, the location history being for the object.

21. The system as recited in claim 18, wherein the training means comprises:
addition means for adding a location of an object corresponding to an time interval of a designated time period in a training matrix for multiple time intervals of multiple time periods of the location history.

22. The system as recited in claim 21, wherein the addition means comprises:
transitional addition means for adding a current location of the object corresponding to a current time interval in the training matrix in dependence on a previous location of the object corresponding to a previous time interval.

23. The system as recited in claim 18, wherein the training means comprises:
normalization means for normalizing multiple time intervals of a matrix, with regard to a number of time periods of the location history used by the training means, to determine relative probabilities per location for each time interval of the multiple time intervals.

24. The system as recited in claim 18, further comprising:
effectuation means for implementing an application using the stochastic model of the location history, the application selected from a group comprising: probabilistic location estimation, fusion of location estimates, location-history simulation, optimal scheduling, transition analysis, and clique analysis.

25. A method comprising:
adding, by a computing device, object locations to a training matrix for time intervals of a designated cycle from a location history;
normalizing, by the computing device, the time intervals with regard to a number of the cycles addressed in the adding to determine relative probabilities an object is present per location for each interval, each probability being calculated by dividing a total number of times that the location history shows the object as being at one of the locations during one of the time intervals by a total number of recurrences of the cycle;
building and storing, by the computing device, a stochastic model by recording the respective location probabilities determined in the normalizing for corresponding intervals in a location history model matrix; and
implementing, by the computing device, an application using a stored location history model matrix, the application selected from a group comprising: a probabilistic location estimation, a fusion of location estimates, a location-history simulation, an optimal scheduling, a transition analysis, and a clique analysis.

26. The method as recited in claim 25, wherein the adding comprises:
inspecting a particular time interval of a particular cycle of the location history;
determining a particular object location during the particular time interval from the location history; and
incrementing in the training matrix a subtotal for a matrix interval corresponding to the particular time interval at an object location corresponding to the particular object location.

27. The method as recited in claim 25, wherein the adding comprises:
adding the object locations to the training matrix for time intervals of the designated cycle from the location history while accounting for previous object locations in previous time intervals.

28. The method as recited in claim 25, wherein the adding comprises:
adding to the object locations using split ratios to account for intra-interval location transitions.

29. A device comprising:
at least one processor; and
one or more computer program products embodied on computer readable storage media including processor-executable instructions, the processor-executable instructions including:
a stochastic location history model comprising a three-dimensional matrix having a plurality of probabilities; a first dimension comprising multiple intervals of a cycle, a second dimension comprising multiple previous object locations, and a third dimension comprising multiple current object locations; each probability of the plurality of probabilities corresponding to an intersection of the second and third dimensions, each particular probability associated with a particular current object location given an intersecting previous object location, each probability comprising a probability that an object is present at the associated current object location during a corresponding interval given the intersecting previous object location, the probability being calculated by dividing a total number of times that the location history shows the object as being at the corresponding one of the multiple locations during the corresponding one of the time intervals by a total number of recurrences of the time period, wherein the processor-executable instructions, when executed, direct the device to predict an object's location during a particular interval using at least one cumulative distributive function (CDF) that is derived from the stochastic location history model.

30. The device as recited in claim 29, wherein a two-dimensional matrix, which is formed from the second and third dimensions of the three-dimensional matrix, exists for each interval of the multiple intervals of the cycle of the first dimension of the three-dimensional matrix.

31. The device as recited in claim 29, wherein the processor-executable instructions, when executed, direct the device to effectuate and/or implement an application using the location history model data structure, the application selected from a group comprising: probabilistic location estimation, fusion of location estimates, location-history simulation, optimal scheduling, transition analysis, and clique analysis.

* * * * *